United States Patent [19]

Foulkes

[11] 4,020,882
[45] May 3, 1977

[54] MANUFACTURE OF BATTERY PLATES

[75] Inventor: Stanley Charles Foulkes, Bolton, England

[73] Assignee: Chloride Group Limited, London, England

[22] Filed: Oct. 20, 1975

[21] Appl. No.: 623,630

[52] U.S. Cl. .................................. 141/1.1; 429/225
[51] Int. Cl.² ........................................... H01M 4/82
[58] Field of Search ................... 136/67, 27, 43; 429/225; 141/1.1

[56] References Cited
UNITED STATES PATENTS

| | | | |
|---|---|---|---|
| 3,228,796 | 1/1966 | Barak et al. | 136/67 |
| 3,542,600 | 11/1970 | Pohlmann | 136/67 X |
| 3,885,988 | 5/1975 | Bohle | 136/67 X |

*Primary Examiner*—C. F. Lefevour
*Attorney, Agent, or Firm*—Oblon, Fisher, Spivak, McClelland & Maier

[57] ABSTRACT

There is disclosed a method for preparing enveloped plates for batteries which comprises introducing an active material composition into the porous envelope of an enveloped plate when the envelope is assembled on the current conducting element of the plate, characterized in that the active material composition is introduced into the envelope as an aqueous slurry which has a rotating vane viscometer torque value (which is defined in the specification) in the range 0.006 to 0.06 lbs ft at 20° C.

A variety of suitable active material compositions are described together with apparatus suitable for carrying out the method.

18 Claims, 8 Drawing Figures

MANUFACTURE OF BATTERY PLATES

This invention relates to the manufacture of battery plates especially those of tubular type and is concerned in particular with the filling of the tubes of such plates, novel apparatus for carrying out the method and novel active material paste composition.

Tubular plates can have a variety of different types of tube material and tube configurations and can have tubes joined together or formed as separate tubes which are separately located on the spines.

One example of such separate tube arrangements utilizes woven fabric tubes having a thin outer plastic sheath provided with perforations about 1–2 mm across spaced apart by about 1 to 2 mms. The plastic sheath is about 0.1 to 0.2 mms thick.

The invention, though not limited to such arrangements, however is described with particular reference to tube arrangements in which the tubes are a single preformed assembly since this facilitates assembly of the tubes onto the spines of the plate.

A conventional method for making tubular plates involves impregnating fabric tubes with a resin to render them stiff though still permeable, locating the tubes on an array of lead alloy spines, one spine to each tube, and filling the space between the interior of the tubes and the spines with active material e.g. lead oxide powder from a hopper and shaking the assembly to compact the power in the tube. This method has considerable problems including waste of lead oxide powder, inconsistency of filling weight, and unevenness of filling, the active material tending to become over consolidated at what is the bottom of the tubes during filling but is the top of the tubes in use.

One proposal, in G.B. Pat. No. 947,796, for reducing these problems was to extrude an active material paste containing a water soluble thickening agent into the tubes under high pressure. However, this method resulted in plates which had unpredictably variable electrical performance. There was also a tendency for the paste to break down and lose its fluidity under pressure and also to go solid inside the machinery if there were any intervals or delay in the production sequence.

Another proposal, in G.B. Patent No. 1,386,056, is to inject a metered volume, corresponding to the internal volume of the tubular plate, of an acidic automotive battery paste into the tubes within a very short space of time e.g. less than 1.5 seconds. The paste has a certain amount of additional water added to it. This is alleged to form a suspension, but in fact this mixture is a thick paste which is not self levelling. The pastes which are disclosed contain 3 parts grey lead oxide, 1 part red lead oxide, 2.96 parts by weight of oxides to each part by weight of acid and water and 0.06 parts by weight of 1.4 specific gravity sulphuric acid for each part by weight of oxide, i.e. 12.6% of the grey lead oxide was sulphated. The specification describes the pastes as having dynamic viscosities in the range 3000 to 4000 centipoises. No indication is given of what method of measurement of viscosity or measuring apparatus is to be used.

We have measured the viscosity of the above paste described in British Patent No. 1,386,056 on a rotating vane viscometer as described below using the measurement technique described below.

We find that this paste has a rotating vane viscometer torque value (as defined herein) of 3.5 lbs ft. The paste is not self levelling; that is when a mass is deposited as a lump on a flat surface it does not assume a flat level surface within a period of 24 hours, though small amounts of liquids separate out from the solids during this period.

The process has the disadvantage of requiring accurate metering of the volume of paste to be injected and the paste is so viscous that it has to be forced into the tubes under high pressure.

This need to use high pressure results in variation in density of the paste along the length of the tubes, the paste tending to become over consolidated at the inlets to the tubes which are the bottoms of the tubes in use. In addition it introduces difficulties in getting the paste to travel the full length of a tube, especially in a deep plate. This severely limits the size of plate which can be filled. This introduces further problems in production of batteries from the paste and in use of the batteries.

We have discovered that these problems can severally and collectively be reduced by using a radically different active material composition, apparatus and method in which a pourable liquid slurry of low viscosity is fed into the tubes under gravity or low pressure and then, when the tubes are full, preferably consolidated by allowing the back pressure to build up.

By controlling the value to which the back pressure is allowed to rise, the degree of consolidation can be varied as desired and an even consolidation achieved. A slurry of very low viscosity is fed into the tubes under gravity or very low pressure conditions.

According to the present invention, a method of filling enveloped plates, e.g. tubular plates, for batteries, e.g. lead acid batteries, which comprises introducing an active material composition into the porous envelope of an enveloped plate e.g. the tubes, when the envelope is assembled on the current conducting element of the plate, e.g. the spines, is characterised in that the active material composition is introduced into the envelope as an aqueous slurry, the material of the envelope desirably being selected to filter out active material whilst allowing passage of liquid and the introduction of the slurry into the envelope is continued until the envelope is filled with active material, the introduction of the the slurry into the envelope preferably being carried out at a pressure of less than 15 psi and desirably less than 5 psi until the envelope is filled with the composition, and the pressure then preferably being allowed to rise to a value above 15 psi or 5 psi but not in excess of 100 psi and the pressure thereafter being released and in that the composition has a rotating vane viscometer torque value (as defined herein) in the range 0.006 to 0.050 or 0.06 and preferably 0.015 to 0.04 lbs ft at 20°C.

For ease of description the process will be described essentially with reference to tubular plates.

The ratio of volume of slurry which is fed into the tubes, to the total internal free volume of the tubes in the plate is preferably not more than 3:1 e.g. less than 2:1.

The internal free volume of the tubes is that volume within the internal diameter of the tubes which is not occupied by the current conducting elements.

The aqueous slurry comprises a blend of water and particulate active material. The slurry may be non acidified or may have had acid added to at least partially sulphate the oxide.

The weight ratio which should be used depends on the particular active material which is being used, the permeability of the tubes which are being filled and whether the composition contains acid or not and, if it does contain acid, the ratio of acid to active material, i.e. the degree of sulphation.

With the non-woven fabric described below we prefer to use non acidified slurries having a solids to liquids ratio of 2.5:1 to 3.5:1 and with partially acidified slurries a solids to liquids ratio of 1.7:1 to 2.5:1, the acid having the effect of considerably increasing the viscosity of the slurry.

The slurry can contain conventional fillers and additives for the active material such as hydrophobic or hydrophilic silica, so long as the composition continues to have a viscosity as defined above. In one arrangement, the tubes are allowed to fill substantially under gravity by being pumped into the tubes under zero back pressure, the pumping is continued and the back pressure allowed to build up to a value not in excess of 70 psi. Thus the pressure may be in the range 5 to 50, e.g. 10 to 30 psi. The time over which the pressure build-up is allowed to occur is not critical. Usually the pressure is merely allowed to build up to a set value at which point the pressure is released.

Surprisingly and in contrast to the prior proposals where the whole filling operation is carried out under high pressure, which results in the active material being stratified, the paste being more dense nearer the inlet (which will be the bottom of the tubes in use), this arrangement enables the density of the active material in the tube to be increased evenly throughout the tube.

As mentioned above the ratio of active material to liquids which should be used depends on a variety of factors including the nature of the material from which the tubes are made.

A balance must be struck between the need for the material to have a high water permeability to provide good conductivity in use in the battery and the need for the material to retain the active material so as to enable filling to be carried out rapidly and the active material to be retained in the tubes over long periods of use and under conditions of shock and vibration. One suitable material is made from a non-woven batt of polyester fibres which is 0.5 to 0.7 mm thick and weighs 120 to 160 grams per sq. cm, has a nitrogen permeability (as hereinafter defined) of 8.0 liters/sq. cm/minute and a water permeability (as hereinafter defined) of 1.5 liters/sq cm/minute. This material is preferably not perforated, its porosity being derived from the natural gaps between the fibres from which it is made.

More broadly, it is preferred to use a material having a nitrogen permeability in the range 0.5 to 12, e.g. 1 to 10 or preferably 3 to 9 liters/sq cm/minute. Desirably, it should also have a water permeability of at least 0.01 liters/sq cm/minute e.g. 0.1 or 0.5 to 1, 2 or 5 liters per minute or more.

As indicated below, it is preferred to use a slurry composition in which the active material particles have an average particle size in the range 5 to 20 microns. However, material with average particle sizes in the range 1 to 30 or 50 to 100 microns can equally well be used.

Referring again to lead acid systems the lead oxide preferably has substantially all of its particles having particle sizes less than 100 microns, e.g. less than 1% by weight are above 200 microns in diameter. In addition, less than 1% is below 0.001 micron in diameter. Typically, at least 50% e.g. 95% by weight, is less than 10 microns and 5% is less than 1 micron. The oxide may comprise grey lead oxide or red lead oxide or a blend of grey lead oxide and red lead oxide and preferably a blend of grey lead oxide of average particle size 20 microns and red lead oxide of average particle size 5 to 10 microns. The ratio of grey to red lead may be in the range 95:5 to 5:95 through 90:10 to 50:50, e.g. 33:67 is preferred.

Preferably, the tubes are clamped at the top and bottom so that liquids can escape out from the whole area of the tubes.

Desirably, a supply of the slurry composition is continuously mixed during the filling and a minor proportion of the slurry supply is introduced from this continuously mixed supply into each tubular plate.

The supply of slurry composition is preferably delivered by a pump which gives smooth delivery and maintains the slurry in suspension and the slurry, in the intervals between introduction into a tubular plate, is recirculated from the outlet of the pump back to its inlet, e.g. via a recirculating tube connected to the pump outlet, and an agitated storage tank, from which a supply tube extends to the pump inlet.

In a first form of the method, the slurry is introduced from a pump into one tubular plate then when that plate is filled is continuously recirculated from the outlet of the pump to the pump inlet and is then introduced into another tubular plate.

The invention may be put into practice in various ways and one specific embodiment and certain modifications will be described by way of example with reference to the the accompanying drawings, in which.

Figure 1:
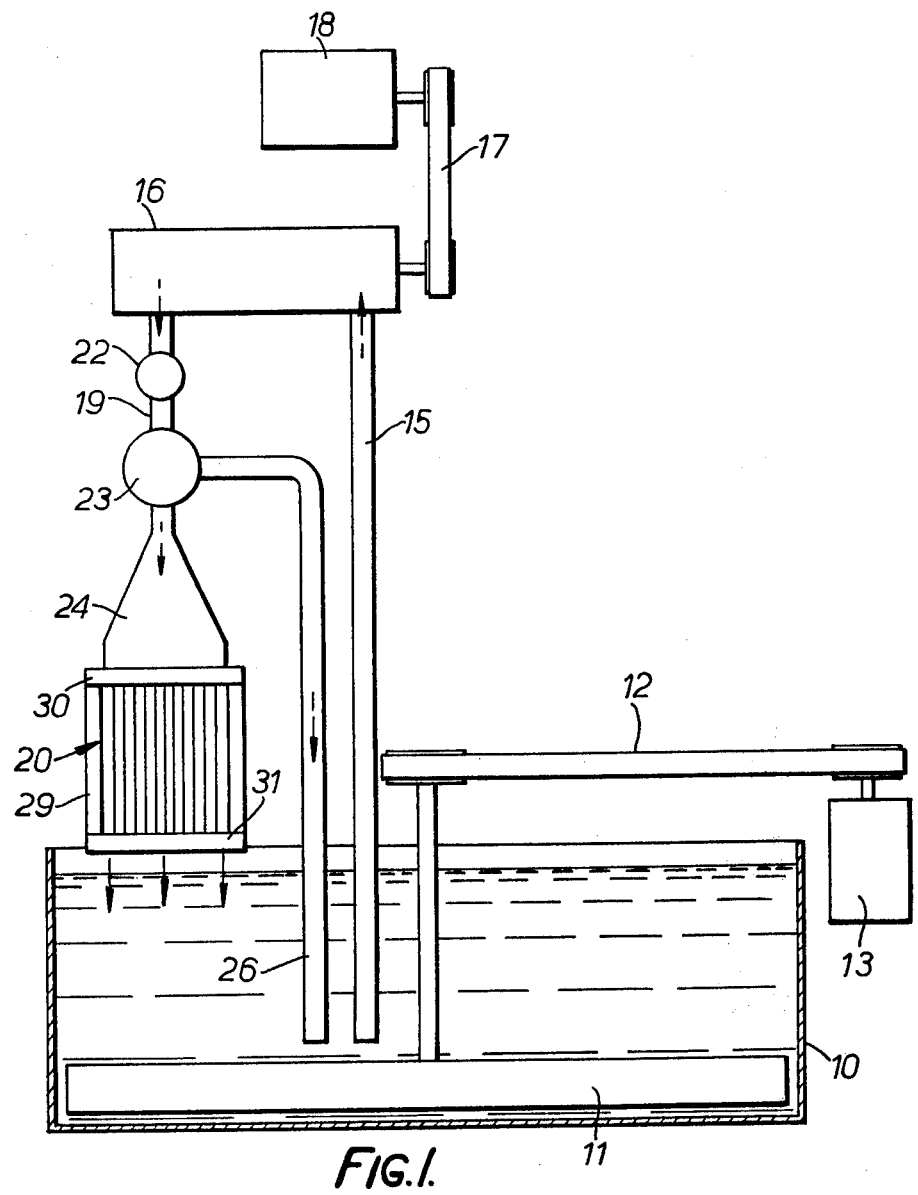
FIG. 1 is a diagrammatic side elevation of apparatus in accordance with the invention.
Figure 2:
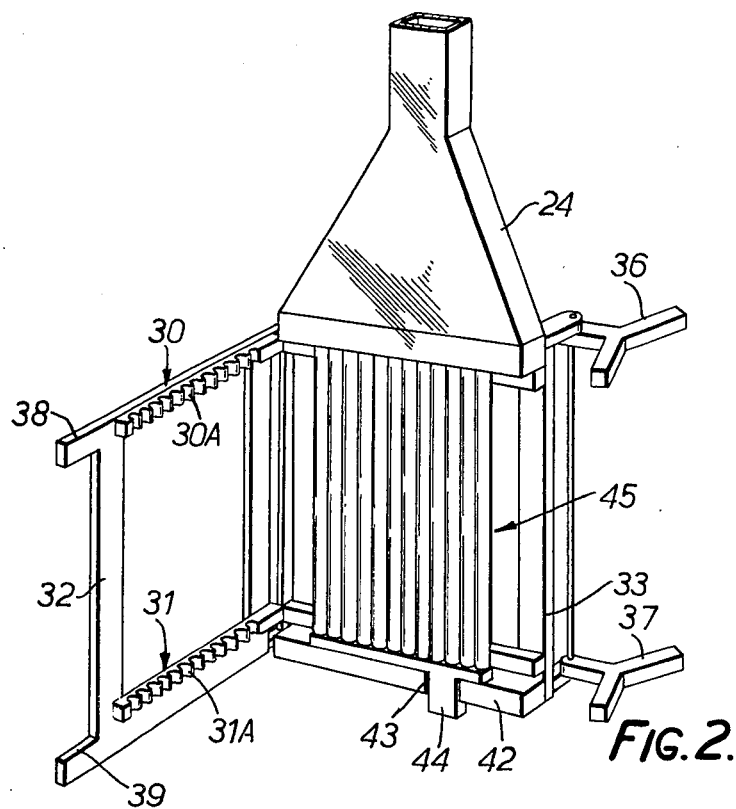
FIG. 2 is an enlarged diagrammatic perspective view of the filling box shown in FIG. 1.
Figure 4:
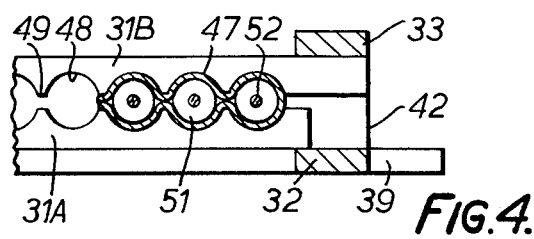
FIG. 4 is a cross-sectional plan view on the line IV—IV of FIG. 3.
Figure 3:
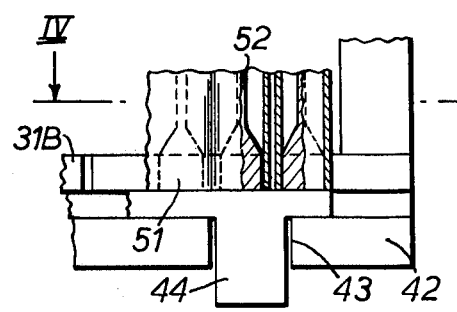
FIG. 3 is a diagrammatic view of part of the lower clamp shown in FIG. 2 in the open position, showing only some of the tubes of the plate.

The apparatus consists of a slurry tank 10 in which the slurry to be filled into the plate tubes is stored. The tank is fitted with a paddle 11 located at the bottom of the tank and driven by a belt and pulley drive 12 from a variable speed motor 13. A vertical feed tube 15 extends up from just above the paddle 11 to the inlet to a supply pump 16 which is also driven by a belt and pulley drive 17 from a variable speed motor 18. The outlet of the pump 16 is connected vertically downwards by a supply pipe 19 to a plate filling station 20. The supply pipe proceeds via a pressure gauge 22 a two-way valve 23 and a fishtail manifold 24. The valve 23 either permits the slurry to flow vertically downwards to the station 20 or can be positioned to direct the slurry to the tank 10 via a recirculating tube 25 which extends down to just above the paddle 11. The tubes 15 and 26 are preferably of the same cross-sectional area.

The mass of the supply of slurry is preferably maintained at about 150 kg, e.g. 100 to 200 kg, and the mass of slurry introduced into each tubular plate, the individual filling weight, is of the order of 400 to 1,000 gm. More broadly, the weight ratio of the active material, e.g. 75 kg, in the continuously mixed slurry supply to the individual filling weight is in the range 1300:1 to 25:1 preferably 1000:1 to 200:1 more particularly 160:1 to 100:1.

The station 20 comprises a frame 29 rigidly secured in relation to the manifold 24 and carrying top and bottom clamps 30 and 31.

The clamps 30 and 31 are toothed and conform to the outside surface profile of the bottom and top of the tubular plate since the plate is inserted in the clamps with its open bottom end facing the manifold 24. The manifold has an outlet nozzle assembly consisting of one-fourth inch long copper or other rigid feed tubes with external diameters corresponding to the internal diameters of the plate tubes and spaced apart in a straight line, the centres of the feed tubes being on the centres of the plate tubes.

Thus the open ends of the plate tubes fit snugly over the feed tubes and are clamped thereto by the top clamp 30 which may be provided with a resilient sealing liner.

The lower clamp 31 holds the plate in position and presses the tubes against a thickened end section on the spines. The faces of the plate are completely free.

The spines are of conventional lead alloy composition and of conventional structure being located on a top bar at centres corresponding to the centres of the tubes with which they will be used. They are desirably provided with short axial fins which are used to centre the spines in the tubes and to prevent the spines being distorted during handling prior to filling.

The station 20 will now be described in more detail with reference to FIGS. 2 to 5.

As mentioned above, the station 20 comprises a frame 29 rigidly secured in relation to the manifold 24. This frame is in two parts 32 and 33 hinged to each other along the left hand edge, and it is the part 33 which is rigidly attached to the manifold 24. The top and bottom clamps are each in two parts 30A and 30B and 31A and 31B. 30A and 31A are carried by the movable part 32 of the frame 29 and 30B and 31B are carried by the fixed part 33 of the frame 29.

The fixed part 33 also carries top and bottom locking levers 36 and 37 which are arranged to engage top and bottom handles 38 and 39 on the movable frame part 32, and lock the filling station closed.

The fixed part 33 of the frame 29 also carries a bottom support bar 42 which has an aperture 43 through which the lug 44 of a plate 45 can pass and which assists in registering the plate in the filling station.

The top and bottom clamps 30 and 31 have toothed profiles which conform to the external sheathed dimensions of the plate and the two portions of each clamp when closed define a row of cylindrical holes 48 connected by gaps 49 twice the thickness of the fabric 47 of the sheath so as to prevent the sheath being cut by the clamps.

The bottom clamp 31 presses the fabric 47 of the sheath against the broadened shoulders 51 of the spines 52 of the plate to ensure a tight seal. (See FIGS. 3 and 4).

Figure 5:
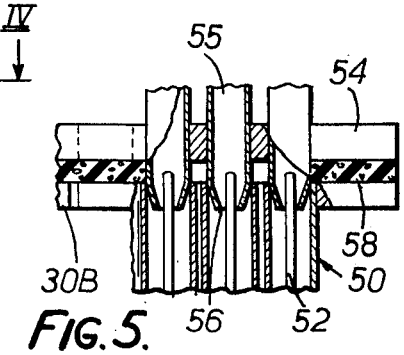
FIG. 5 is a part cross-sectional view of part of the upper clamp in the open position, as in FIG. 3.

FIG. 5 shows the clamping arrangement at the manifold 24. A manifold plate 54 has a row of feed tubes 55 passing down through it and having narrowed ends 56 which extend through apertures in a rubber gasket 58. It is resilient being compressible by finger pressure to only about half its uncompressed thickness, which is about one-eighth inch thick. The arrangement shown in FIG. 5 shows the sheath 50 in position over the ends 56 of the feed tubes. However, the arrangement is in fact such that the gasket 58 has to be compressed by about one-sixteenth inch by the sheath 50 being forced up into it in order to get the top bar of the plate onto the bottom bar 42 of the frame. (This compression has not been shown on the drawing). The clamp 30 presses the fabric 47 of the sheath around the ends 56 of the feed tubes 55 to achieve a good top seal.

The pump 16 is one which gives smooth delivery and is of the well known type, such as that marketed under the trade name MONOPUMP, which comprises a rotor in the form of a single start helix fitting in a cylinder in the form of a double start helix of twice the pitch of the rotor, in which the rotor turns about its own axis in one direction whilst its axis orbits about the axis of the cylinder in the opposite direction at the same speed. This form of pump gives a positive displacement with uniform flow, and prevents the separation of liquids and solids in the composition.

In another arrangement (not shown) the filling station 20 is formed as a twin manifold arrangement each manifold being fed from the pump 16. The two way valve 23 is replaced by a three way valve and each line from the valve 23 to a manifold contains a pressure responsive valve 70.

This valve 70 is preferably a pressure release valve which can be set to any desired pressure e.g. 15 psi and when this pressure is reached will hold the pressure at 15 psi until actuated, e.g. manually.

The procedure would then be for a plate to be inserted in one manifold and the valve 23 switched either from recirculation or from the other manifold. The plate would fill e.g. in 5 seconds and then the pressure would rise to 15 psi and be held there for 5 seconds. During this time the operator would have removed the filled plate from the other manifold and inserted a new plate. He could then switch the valve 23 either to recirculate momentarily or immediately to fill the new plate.

In an alternative arrangement the pressure release valves 70 is arranged to switch the pump supply to recirculation and release the pressure on the plate as soon as the preset pressure is reached.

In operation, the filling process is as follows.

The composition is made up to the desired composition in the tank 10 by use of the paddle 11. A tubular plate 50 is assembled, the fabric tubes 47 being located on the metal spines 52, and it is positioned against the clamps 30B and 31B, at the station 20 with its open bottom ends pushed up against the gasket 58 and over ends 56 of the feed tubes 55 of the manifold 24. The part 32 of the frame is then swung closed against the part 33 and the clamps 30 and 31 thus closed and the locking arms 36 and 37 secured over the handles 38 and 39. The paddle 11 is kept in operation and the valve 23 is turned to the recirculating position connecting the pump 16 to the tube 28 and the pump 16 is switched on. Recirculation is carried out until the flow is steady. The pressure indicator 22 indicates zero pressure whilst recirculation is occurring.

The valve 23 is then switched to connect the pump 16 to the manifold 24. The slurry passes down into the station 20, the active material filling the interior of the tubes. The valve 23 is maintained in this position until the tubes have filled with active material at which point the pressure indicator indicates a relatively sudden increase in pressure. At this point liquid exudes in globules from over the whole surface of the tubular plate essentially simultaneously. As the pressure rises to the cut off pressure further small amounts of liquids exude from the plates.

The first liquids tend to be clear; later liquids tend to also contain active material. When the pressure reaches the desired shut off valve the valve 23 is then switched to recirculate the composition to the tank 10 via the pipe 26.

The clamps 30 and 31 are then opened and the filled plate removed and the further processing operations such as bottom bar insertion, pickling, drying and electrolytic formation carried out on the plate.

The excess slurry in the manifold 24 falls down into the tank 10.

In continuous operation, the pressure rise indicated by the indicator 22 could be used to control the filling cycle, e.g. to activate the valve 23, and open the clamps 30 and 31 to disengage it from the manifold 24 and re-engage a new plate in the clamped position. Limit switches could be provided, which would be activated by the new plate engaging the manifold 24 to divert the valve 23 back to the filling position.

EXAMPLES

Examples will now be given of specific plate production techniques.

The plates were positive plates having 15 tubes each 14.5 inches long. The tubes were made of non woven polyethylene terephthalate fibre. This is made as follows:

A thin web (1.5 metres wide) of fibres having an average length of 4½ inches is produced by carding, and a fleece is produced by layering approximately ten webs to form a continuous length of non-woven fabric (also 1.5 metres wide).

The fibres extend generally longitudinally in the web, which is pleated in a zig-zag fashion as it is taken off from a conveyor travelling in the direction of the length of the web onto a conveyor travelling at right angles thereto. Thus the fibres extend substantially transversely to the length of the fleece, but due to the travel of the second conveyor the fibres in adjacent layers are oppositely inclined at a small angle to the transverse direction.

This material is then impregnated with 50% by weight of polyacrylic binder. It has a thickness of 0.5 to 0.7 mm and weighs 120 to 160 grams/sq cm.

This material is then converted into an array of tubes by passing two layers of it through a multiple sewing machine to secure the layers together along parallel lines (for example, spaced about 2 to the inch) to form pockets or tubes in the conventional manner.

This material is then dipped in a phenolic resin and dried. The material picks up 30% of phenolic resin based on the dry weight of the non-woven material. After cutting to length circular section mandrels 0.287 inches in diameter are then inserted between the rows of stitches to form the pockets. It has an air permeability of 8.0 litres/minute/sq cm and a water permeability of 1.5 litres/minute/sq cm area.

This non-woven fabric is made up of randomly entangled individual fibres. The fibres have a diameter of about 25 microns or more broadly 20 to 50 microns. The gaps between individual fibres are in general less than 250 microns and mostly less than 100 microns and moreover the material in having a thickness of 0.5 to 0.7 mms has a three dimensional structure permitting the overlap of many individual fibres in any one path from face to face of the sheet.

Air permeability was measured as follows:

A sample 2.8 cm in diameter (6.16 sq cm effective cross-sectional area) was clamped in position and the time for 50 l of dry nitrogen to flow through the sample at 20° C under pressure difference of 0.6 inches (1.5 cms) water gauge was recorded.

The material is too permeable for mercury porosimetry or air flow through an alcohol saturated sample to be accurate measurement techniques.

Water permeability was measured on the same sample by measuring the time taken for a column of water initially 42 cm high and 1 litre in volume to flow under gravity through the sample.

The downstream end of the column below the sample was blocked off, the water introduced above the sample and then the downstream end below the sample opened to atmosphere. This material is referred to as the non woven fabric N.W. in Table 1 below.

Another fabric was also used. It was a spun woven fabric referred to as SW in Table 1 below and having an air permeability of 6.0 litres/sq cm/minute. It has 17 weft threads per cm and 22 warp threads per cm. The warp threads being about 250 microns in diameter and the weft threads being about 375 microns in diameter. Microscopic examination indicates that the gaps between adjacent warp threads and adjacent weft threads are about 250 microns by 250 microns maximum but these gaps are bridged by numerous loose fibres extending out from the threads.

The compositions used are indicated in Tables 1A and 1B below.

The slurry was made from mixtures of grey lead oxide (average particle size 20 microns) and red lead oxide (average particle size 5 to 10 microns) mixed in various weight ratios with mains water.

The solid particles in the slurry were such that less than 1% by weight were above 200 microns, and less than 1% were below 0.001 microns, 95% by weight were less than 50 microns. These particle sizes were determined by sieving.

The tank 10 contained 150 kg of slurry, the paddle 11, 30 inches by 1.5 inches, was rotated at 30 to 70 rpm, to maintain solids in suspension. The pump 16 was run at various volume throughputs as indicated in Table 1A. During recirculation the pressure indicator 22 showed zero pressure. Using the same stirring and pumping conditions, the valve 23 was switched to the fill position, and the time for which the indicator 22 showed zero pressure recorded and the total time up to when the valve 23 was again switched to recirculation and the maximum pressure reached recorded. These are given in Table 1A. The internal volume of the tubes was 170 cc.

It is preferred to add acid to at least partially sulphate the oxide; 1 gram of oxide requires 0.4 mls of 1.4 sp gr sulphuric acid to achieve this. The mixing of the slurry continues in the storage tank during the acid addition and once this is completed the filling cycle can be continued. Certain of the Examples in Tables 1A and 1B are of partially acidified compositions.

Example 12 was carried out using tubes having a total internal free volume of 105 cc.

TABLE 1A

| Example | Grey:Red | Solids liquids | % Sulpha-tion | Type of tube | Pump speed | Pump vol. cc/sec | Time to start of Pressure build-up T1 seconds | Theoretical volume pumped to start of pressure build-up ccs | Total time to end of pressure increase T2 seconds | Time for which pressure applied T₂-T₁ seconds | Pressure at shut off of valve p.s.i. |
|---|---|---|---|---|---|---|---|---|---|---|---|
| 1 | 66:34 | 3.5:1 | none | NW | 40 | 122.5 | — | — | 20 | — | 40 |
| 2 | " | 2.57:1 | " | NW | 40 | " | 2.0 | 245 | 6.0 | 4.0 | 40 |
| 3 | " | 2.52:1 | " | " | " | " | 2.0 | " | 5.5 | 3.5 | 36 |
| 4 | 73:25 | 2.88:1 | 4.0% | the paste could not be introduced into the tubes | | | | | | | |
| 5 | " | 2.39:1 | " | NW | 60 | 198 | — | — | 6 | — | 30 |
| 6 | " | 2.36:1 | " | NW | 60 | " | 2.0 | 396 | — | — | 1 |
| 7 | " | 2.34:1 | " | SW | 60 | " | — | — | 3.3 | — | 40 |
| 8 | " | 1.81:1 | " | NW | 40 | 122.5 | — | — | 5.0 | — | 40 |
| 9 | " | 1.78:1 | " | NW | " | " | 1.5 | 184 | — | — | 6 |
| 10 | 75:25 | 3:1 | none | NW | 0 | 33 | 5.7 | | | | 4 |
| 11 | 75:25 | 3:1 | " | SW | 0 | 33 | — | | 10 | | 50 |
| 12 | 100: | 0.9:1 | 17% | NW | | 200 | 1 | 200 | 3 | 2 | 20 |

TABLE 1B

| Example | Grey grams | Red grams | Water ml. | Acid ml. | Wet paste in plate grams | Filtrate weight grams | % settlement of sample of slurry | ½ life of sample of slurry | % settlement of filtrate | ½ life filtrate |
|---|---|---|---|---|---|---|---|---|---|---|
| 1 | 53000 80000 | 27000 | 20000 | none | 814 | — | | | | |
| 2 | 66384 | | 25879 | " | 1089 | 228 | | | | |
| 3 | 65300 | | 25879 | " | 967 | 342 | | | | |
| 4 | 45000 60000 | 15000 | 20000 | 1000 | — | — | paste was not self leveling and held its shape for at least 24 hours but some liquids did separate out. | | | |
| 5 | 58889 | | 23611 | " | 887 | none | | | | |
| 6 | 56957 | | 23174 | " | 437 | none | | | | |
| 7 | 56520 | | 23174 | " | 828 | 43 | | | 76.3 | 5 mins 42 seconds |
| 8 | 54706 | | 29174 | " | 876 | 75 | | | 53.6 | |
| 9 | 53830 | | " | " | 539 | — | | | | |
| 10 | — | — | — | none | 915 | — | | | | |
| 11 | — | — | — | " | 333 | — | | | | |
| 12 | 87131 | — | 90900 | 7000 | 272 | — | 91 | — | — | — |

Notes on table 1A and 1B 1) Acid/solid ratios. It has been assumed that all the acid is absorbed by and reacted with the excess oxide at the stage when it is first added and thus the acid/oxide ratio remains constant until more acid is added i.e. a proportion of the acid is removed with each sample of paste which is removed.
2) Solid/liquid ratios.

A) These are calculated including the whole of any acid added as liquid.

B) The weights of solids removed in the samples of the filtrates have been ignored since the weights of these samples were relatively small and there was no way of easily determining the ratio of solids to liquids in the filtrates.

C) The ratios have been calculated ignoring the amount of liquids removed in the paste in the tubes. These ratios therefore slightly underestimate the solids content of the slurries.

3) Grey/red ratios. These have been assumed to remain constant except when extra grey or red oxide is added.

4) Wet paste in plate. The weight x of the fabric tube the lead spines and a bottom bar was measured. The values quoted are the wet filled plate after bottom-baring minus x.

5) % Settlement of the sample. This is the height A of the solids in the container divided by the height B of the liquids from the bottom of the container expressed as a percentage after the sample had been thoroughly shaken for 1/2 minute and then allowed to settle in a vertical position for 24 hours.

The container is a round bottomed test tube of 1.5 cms internal diameter and at least 9 cms of slurry are placed in the test tube.

6) 1/2 life of the suspension. This is the time taken for the solids level of the sample in the container described under 5) above to sink to halfway between B and A.

The test is carried out by placing a rubber band with its bottom edge at the halfway level i.e. (B +A) /2 cms from the bottom of the test tube, shaking the tube vigorously for at least 1/2 minute or until all the solids are displaced from the bottom of the test tube and then righting the test tube and measuring the time from that instant to the instant when light is first visible under the rubber band.

7) Pump speed. This is merely a setting. The volume of slurry pumped through the manifold was measured at varying settings by collecting the slurry as it came out of the manifold. Two measurements were made for each pump setting. The volume of slurry was measured.

A graph was then plotted for the 0, 20, 30 and 40 pump settings of volume against time in seconds (using a stop watch). A reasonable straight line plot was obtained.

8) Time to start of pressure build up. This is the time between the inlet valve being opened and the pressure gauge actually starting to move rather than merely flicker.

9) Theoretical volume pumped to start of pressure build-up. This is the time under the eight column from the left of table 1A multiplied by the volume reading under the seventh column from the left of table 1A and is purely theoretical.

10) Stratification. (Table 3) This is determined by pickling the plates in 1.40 specific gravity for 6 hours followed by drying at 180° F for 12 hours.

The top bar and the bottom bar were then cut off the plate and the remainder cut into four equal horizontal strips labelled A B C and D with A at the bottom bar end of the plate. These were then weighed. The horizontal strips were then cut into four sections of three tubes each leaving out every fourth tube and labelled 1 to 4 with 1 at the lug side of the plate. The four sections one from each of the horizontal strips was then weighed and the value given under 1 in Table 3 is this value. The other vertical sections 2, 3 and 4 were weighed in the same way.

11) Pencil porosity. This is determined by the well known technique of mercury intrusion porosimetry and is done on the same samples as Table 3. Details of this technique are given in British Patent Specification No. 1331257 (EPS 61).

The rotating vane viscometer values for certain of the slurries used in the above examples are given below in Table 2.

Figure 6:
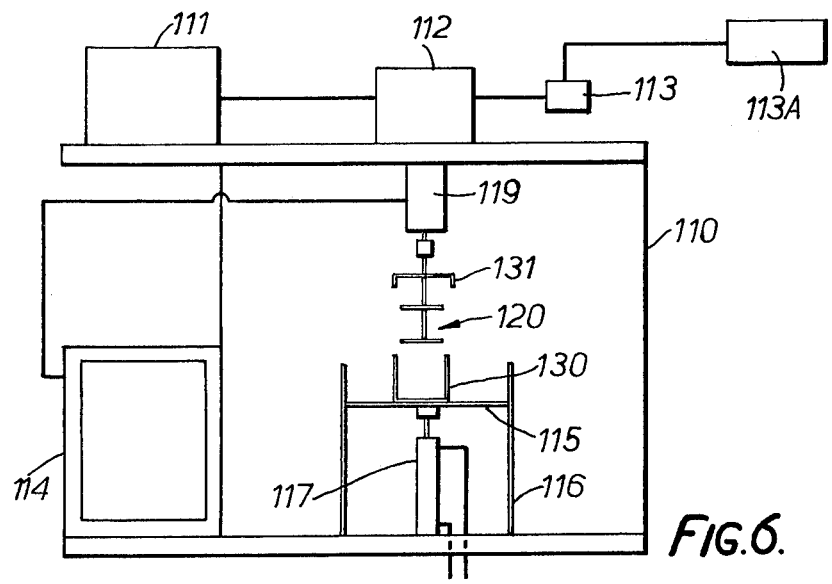
FIG. 6 is a general front elevational view of the rotating vane viscometer used to measure the viscosities of the slurries used in the invention.
Figure 7:
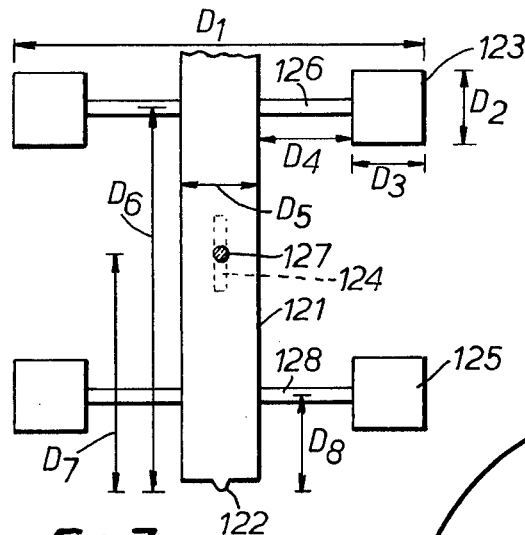
FIG. 7 is a detailed front elevational view of the paddle assembly of the viscometer of FIG. 6.
Figure 8:
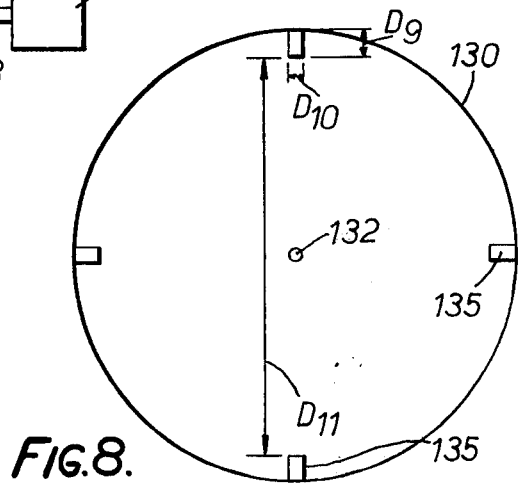
FIG. 8 is a plan view of the container for use with the viscometer of FIG. 6 for containing the sample whose viscosity is to be measured.

The viscometer used is illustrated in FIGS. 6, 7 and 8.

The apparatus consists of a frame 110 carrying an electric motor 111 driving a paddle assembly 120 via a gear box 112 and a torque transducer 119. The speed in the gear box 112 is sensed by a tachogenerator 113 the output of which is fed to a digital voltmeter 113A. The voltage signal produced by the torque transducer is fed to a chart recorder 114. The recorder has a variable chart speed and a variable scale.

A sample container 130 is clampably supported on an adjustable table 115 which can be raised and lowered on guides 116 by a pneumatic cylinder 117.

The sample container 130 has a detachable lid 131 located above the paddle assembly 120. The lid can be secured to the container by an external bayonet lock (not shown).

The paddle assembly 120 is removably attached to the output shaft 118 of the gear box 112, and consists of a central rod 121 having a lower boss 122 which in use nests in a hole 132 in the bottom of the container 130. The rod 121 has a diameter D5 of 1.3 cms and carries 3 pairs of paddles 123, 124 and 125. The paddles 123 and 125 are in the same plane and are at right angles to the paddles 124. All the blades of the paddles are vertical and thus parallel to the axis of the rod 121. The paddles are carried on arms 126, 127 and 128. The distance D6 from the centre of the arm 126 to the boss 122 is 6.5 cms, the distance D7 from the centre of the arm 127 to the boss 122 is 3.9 cms and the distance from the centre of the arm 128 to the boss 122 is 1.6 cms. The width of each paddle D3 is 1.2 cms and its height D2 is 1.2 cms and its thickness 0.1 cm. The distance D4 from the inside edge of each paddle to the surface of the rod 121 is 1.5 cms.

The distance D1 between the outside edges of the paddles in a pair of paddles is 6.8 cms.

The internal height of the container 130 is 8.2 cms and its internal diameter is 8.8 cms. There are four internal baffles 135 located at the ends of diameters at right angles to each other. The thickness D10 of each baffle 135 is 0.30 cms and its inward extent D9 is 0.5 cms. The separation D11 of the baffles on a diameter is 7.65 cms. Each baffle extends the full height of the container.

The container and baffles are made of smooth stainless steel.

The apparatus is used as follows:

The container is filled to a depth of 8.2 cms with the material under test and raised into position, clamped to the table 115 and the lid 131 secured.

The chart recorder 114 is started and the motor 111 is then started with the gearing set for a low shear rate e.g. 6 rpm. The start up torque and steady state torque are detected by the torque transducer 119 and the motor and recorder run until a steady torque value has been recorded for at least 2 minutes. This is the steady state torque value. The torque value at the steady state is quoted and if an initial peak was present this fact is noted. The sample is then removed, shaken with the bulk of the material being measured and the container refilled. The measurement is then repeated at a higher shear rate e.g. 18 rpm. The cycle is repeated for as many shear rates as desired.

The background torque value namely with the container 130 empty was found to be 0.004 lbs ft at all the shear rates quoted in Table 2. The same value was obtained when the container was filled with water.

The rotating vane viscometer torque value as defined herein is the value of the steady state torque value of the sample measured in the above described manner on the above described machine at a shear rate of 6 revolutions of the paddles per minute at ambient temperature of 20° C. minus the background reading at 20° C.

TABLE 2

| Example | Grey Red Oxide | Solids liquids | % Sulphation | Rotating vane viscometer | | |
|---|---|---|---|---|---|---|
| | | | | Shear rate | Torque | Presence of peak |
| 2 | 66:34 | 2.57:1 | none | 6 | 0.017 | No |
| | | | | 18 | 0.014 | — |
| | | | | 30 | 0.014 | — |
| | | | | 42 | 0.014 | — |
| 4 | 75:25 | 2.88:1 | 4.0 | 6 | 0.066 | Yes |
| | | | | 24 | 0.066 | No |
| | | | | 42 | 0.066 | No |
| 5 | 75:25 | 2.39:1 | 4.0 | 6 | 0.035 | Yes |
| | | | | 18 | 0.032 | No |
| | | | | 30 | 0.027 | No |
| | | | | 42 | 0.028 | No |
| 10 | 75:25 | 3:1 | — | 6 | 0.014 | Yes |
| | | | | 18 | 0.011 | Yes |
| | | | | 30 | 0.012 | Yes |
| | | | | 42 | 0.013 | — |
| Comparison Example 1 of G.B. 1380865 12 | 3:1 | 2.90:1 | 12.6 | 6 | 3.47 | Yes |
| | 100:0 | 0.90:1 | 17 | 11 | 0.010 | No |

Stratification results for the plates made in Examples 3, 5, 8 and 12 are given in Table 3 below.

Porosity results for the plates made in Examples 3, 5 and 8 are given in Table 4 below.

TABLE 3

| Ex. | Grey red | Solids liquids | % Sulphation | Stratification Top D | middle C | B | bottom A | A - D | Mean | % deviation | 1 | 2 | 3 | 4 | Mean | % deviation |
|---|---|---|---|---|---|---|---|---|---|---|---|---|---|---|---|---|
| 3 | 66:34 | 2.52:1 | none | 295 | 301 | 287 | 287 | −8 | 292.5 | +2 − 4 | 301 | 299 | 304 | 287 | 298 | +2 − 4 |
| 5 | 75:25 | 2.39:1 | 4.0 | 276 | 276 | 285 | 294 | 18 | 282.5 | +4 − 2 | 288 | 288 | 284 | 280 | 285 | +1 − 2 |

TABLE 3-continued

| Ex. | Grey red | Solids liquids | % Sulpha- tion | Stratification Top D | middle C | B | bottom A | A - D | Mean | % deviation | 1 | 2 | 3 | 4 | Mean | % deviation |
|---|---|---|---|---|---|---|---|---|---|---|---|---|---|---|---|---|
| 8 | 75:25 | 1.81:1 | 4.0 | 277 | 269 | 271 | 285 | 8 | 275.5 | 3 – 2 | 276 | 281 | 281 | 274 | 278 | +1 – 2 |
| 12 | 100:0 | 0.90:1 | 17 | 44 | 50 | 61 | 65 | 21 | 55 | +18 – 20 | 46.5 | 43 | 29.5 | 40 | 39.75 | +16 – 20 |

TABLE 4

| Example | 5 | 8 |
|---|---|---|
| Pores between | Porosity % provided by pores having such dimensions | |
| 100 – 50 microns | 0.7 | 0.8 |
| 50 – 25 | 0.5 | 0.4 |
| 25 – 12.5 | 0.6 | 0.4 |
| 12.5 – 6.4 | 0.2 | 0.1 |
| 6.4 – 3.2 | 0.3 | 0.3 |
| 3.2 – 1.6 | 0.2 | 0.4 |
| 1.6 – 0.8 | 0.4 | 1.9 |
| 0.8 – 0.4 | 2.2 | 6.5 |
| 0.4 – 0.2 | 4.3 | 5.4 |
| 0.2 – 0.1 | 4.1 | 4.2 |
| 0.1 – 0.05 | 3.1 | 2.4 |
| 0.05 – 0.035 | 0.8 | 0.5 |
| below 0.035 | 2.1 | 1.6 |
| Total Porosity | 19.5 | 24.9 |
| Apparent Density | 5.5 | 5.0 |
| True Density | 6.8 | 6.6 |

What we claim as our invention and desire to secure by Letters Patent is:

1. A method of filling enveloped plates for batteries which comprises introducing an active material composition into the porous envelope of an enveloped plate when the envelope is assembled on the current conducting element of the plate, characterized in that the active material composition is introduced into the envelope as an aqueous slurry, comprising a lead acid active material composition, which has a rotating vane viscometer torque value in the range 0.006 to 0.06 lbs. ft. at 20° C; said aqueous slurry being introduced into the envelope at a pressure of less than 15 p.s.i. until the envelope is filled with the composition, liquid issuing through the walls of the envelope; the pressure then being allowed to rise to a value above 15 p.si. but not in excess of 100 p.s.i. whereafter the pressure is released.

2. The method of claim 1 in which the aqueous slurry has a rotating vane viscometer torque value of 0.006 to 0.04 lbs ft. at 20° C.

3. The method of claim 1, in which the envelope is an array of tubes arranged side by side with a current conducting element located in each tube.

4. The method of claim 1 in which the ratio of the volume of slurry which is fed into the tubes to the total internal free volume of the tubes in the plate is at least 2:1.

5. The method of claim 1 in which the material of the envelope has a nitrogen permeability in the range of 0.5 to 20 liters/sq.cm/min.

6. The method of claim 1 in which the active material is a lead acid active material which is at least partially sulphated before being introduced into the porous envelope of the plates.

7. The method of claim 1 in which the slurry composition is partially sulphated, the degree of sulphation being below 10%, and the slurry composition has a solids to liquids ratio in parts by weight of 1.7:1 to 2.5:1.

8. The method of claim 1 in which the active material has an average particle size in the range 1 to 100 microns.

9. The method of claim 1 in which the envelope is clamped at the top and bottom whilst the slurry is introduced into the tubes so that the liquids can escape out from the whole area of the envelope.

10. The method of claim 1 in which a supply of the slurry composition is continuously mixed during the filling and a minor proportion of the slurry supply is introduced from this continuously mixed supply into each enveloped plate.

11. The method of claim 1 in which the supply of slurry composition is delivered by a pump to a filling manifold which feeds a plate from an agitated supply of slurry in a storage tank, said pump being one which gives smooth delivery and maintains the slurry in suspension, and the slurry, in the intervals between introduction into an enveloped plate via the filling manifold, is recirculated from the output of the pump, via a recirculating tube connected to the pump outlet, to the storage tank, and thence, via a supply tube, to the pump inlet.

12. The method of claim 4 in which said ratio is between 3:1 and 15:1.

13. The method of claim 5 in which the material of the envelope has a nitrogen permeability in the range 3 to 10 liters/sq.cm/minute.

14. The method of claim 8 in which the material of the envelope is a non-woven batt of polyester fibres which is 0.5 to 0.7 mm thick, weighs 120 to 160 grams per sq cm and has a nitrogen permeability of 8.0 litres/sq.cm/minute.

15. The method of claim 13 in which the material of the envelope is a spun woven fabric having 15 to 25 weft threads per cm, 15 to 25 warp threads per cm and a nitrogen permeability of 5 liters/sq.cm/minute.

16. The method of claim 14 in which the slurry composition is non-acidified and has a solids to liquids ratio in parts by weight of between 2.5:1 and 3.5:1.

17. The method of claim 8 in which the active material has an average particle size in the range 5 to 20 microns.

18. The method of claim 10 in which the weight ratio of the active material, in the continuously mixed slurry supply, to the individual filling weight is in the range 1300:1 to 25:1.

* * * * *